United States Patent [19]

Mogi

[11] Patent Number: 5,044,664
[45] Date of Patent: Sep. 3, 1991

[54] PASSIVE SEAT BELT SYSTEM WITH ADJUSTABLE ANCHOR FOR SHOULDER WEBBING

[75] Inventor: Shinobu Mogi, Fujisawa, Japan

[73] Assignee: Nippon Seiko Kabushiki Kaisha, Tokyo, Japan

[21] Appl. No.: 588,746

[22] Filed: Sep. 27, 1990

Related U.S. Application Data

[63] Continuation-in-part of Ser. No. 452,264, Dec. 18, 1989, abandoned.

[30] Foreign Application Priority Data

Dec. 28, 1988 [JP] Japan ................................. 63-171550

[51] Int. Cl.$^5$ ............................................. B60R 21/10
[52] U.S. Cl. .................... 280/804; 280/808; 297/468; 297/486
[58] Field of Search .................. 280/801, 804, 808; 297/468, 486

[56] References Cited

U.S. PATENT DOCUMENTS

| | | | |
|---|---|---|---|
| 4,695,076 | 9/1987 | Hane | 280/804 |
| 4,702,493 | 10/1987 | Escaravage | 280/808 |
| 4,711,498 | 12/1987 | Adomeit | 297/468 |
| 4,765,651 | 8/1988 | Unger | 280/804 |
| 4,880,254 | 11/1989 | Muller | 280/808 |

FOREIGN PATENT DOCUMENTS

62-16548  1/1987  Japan .

Primary Examiner—Kenneth R. Rice
Attorney, Agent, or Firm—Wegner, Cantor, Mueller & Player

[57] ABSTRACT

A passive seat belt system for a vehicle is disclosed. The system includes a guide rail, a slider, a device for adjusting the restraining position of the slider, a trim covering a rear end portion of the guide rail and the adjusting device, and an openable/closable door formed in the trim at a position corresponding to the position of the adjusting device. The slider carries an occupant-restraining webbing, and is arranged movably along the guide rail between the occupant restraining position and an occupant releasing position. The restraining and releasing positions are on the side of the rear end portion of the guide rail and on the side of a front end portion of the guide rail, respectively. The rear end portion of the guide rail extends vertically along a center pillar of the vehicle. The adjusting device is provided on the side of the rear end portion of the guide rail for adjusting the restraining position of said slider. The openable/closable door is formed in the trim at a position corresponding to the position of the adjusting device. Instead of the door, a concealer trim can be used to close up an opening formed through the trim at a position corresponding to the location of the adjusting device.

16 Claims, 9 Drawing Sheets

PASSIVE SEAT BELT SYSTEM WITH ADJUSTABLE ANCHOR FOR SHOULDER WEBBING

This application is a continuation-in-part of Ser. No. 07/452,264 filed Dec. 18, 1989, now abandoned.

BACKGROUND OF THE INVENTION a) Field of the Invention

The present invention relates to a passive seat belt system for a vehicle, which has an adjustable anchor for a shoulder webbing.

b) Description of the Related Art

Among passive seat belt systems which automatically apply a webbing to an occupant after his sitting in a seat of a vehicle, there are well known those having a guide rail generally provided on an inboard wall of a vehicle body and a slider carrying a webbing fastened at one end thereof on the slider and movable on and along the guide rail to restrain or release the occupant.

In such passive seat belt systems, center pillars and the like are applied with a trim as disclosed in Japanese Utility Model Application Laid-Open No. 16548/1987. Further, there are also known those permitting adjustment of the position of an anchor for a shoulder webbing, namely, the occupant-restraining position so as to ensure protection of an occupant by the webbing.

When a guide rail and an adjusting device for the position of a shoulder anchor are accommodated behind a trim, the position of the shoulder anchor can no longer be adjusted from the outside of the trim. Considerable difficulties have therefore arisen as to the application of a trim.

SUMMARY OF THE INVENTION

With the foregoing in view, the present invention makes use of a trim, which has an openable/closable door, to cover a center pillar at a portion in which an adjusting device for the position of a shoulder anchor and a means for manipulating the adjusting device are located.

To facilitate adjustment of the position of the shoulder anchor, a switch may be provided to move a slider forward over a predetermined distance to have the slider returned to a restraining position while the door of the trim is left open.

As an alternative, a switch which is actuated responsive to opening and closure of the door of the trim may also be provided to move the slider forward over a predetermined distance by the opening of the door and also to have the slider returned to the restraining position by the subsequent closure of the door.

As a further alternative, instead of using the door, it is possible to form an opening in the trim at a position corresponding to the location of the adjusting device for the position of the shoulder anchor and then to close up the opening with a concealing or concealer trim.

In spite of the provision of the trim, it is now possible to adjust the position of the shoulder anchor by opening the door of the trim. The door-equipped trim can improve the interior appearance of a vehicle and owing to the elimination of projections from the trim into the interior of the vehicle, improved safety can be provided for the occupant.

The provision of the switch inside the trim, said switch being useful for moving the slider forward over the predetermined distance upon adjustment of the position of the shoulder anchor, makes it no longer necessary to conduct the complex operation that the slider is first moved to a forward position and is then caused to return to the restraining position upon adjustment of the position of the shoulder anchor. The switch can therefore facilitate the adjustment. The switch which is actuated responsive to opening and closure of the door can also facilitate the adjustment.

Similarly to the provision of the door, the use of the conceal trim to cover up the adjusting device for the position of the shoulder anchor can improve the interior appearance of the vehicle and can also facilitate the adjustment of the position of the shoulder anchor.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Referring first to FIGS. 1 through 6, the construction of the passive seat belt system according to the first embodiment will hereinafter be described.

The passive seat belt system includes an adjusting mechanism for the position of a shoulder anchor. A portion of a center pillar 1, in which the shoulder anchor is accommodated, is covered by a trim 12. Corresponding to an anchor base 21 of the shoulder anchor, the trim 12 has an openable/closable door 11. The trim 12 also defines an opening 16 through which a running member, namely, a slider 40 extends.

The trim 12 is formed of a lower trim 13 fixed on the center pillar 1 and an upper trim 14 located on the side of a room of an unillustrated vehicle and attached to the lower trim 13 by a suitable method such as fitting. The door 11 is formed in the upper trim 14. The door 11 is mounted turnably or pivotally on the upper trim 14 which is fixed, whereby the door 11 can be opened or closed.

Figure 1:
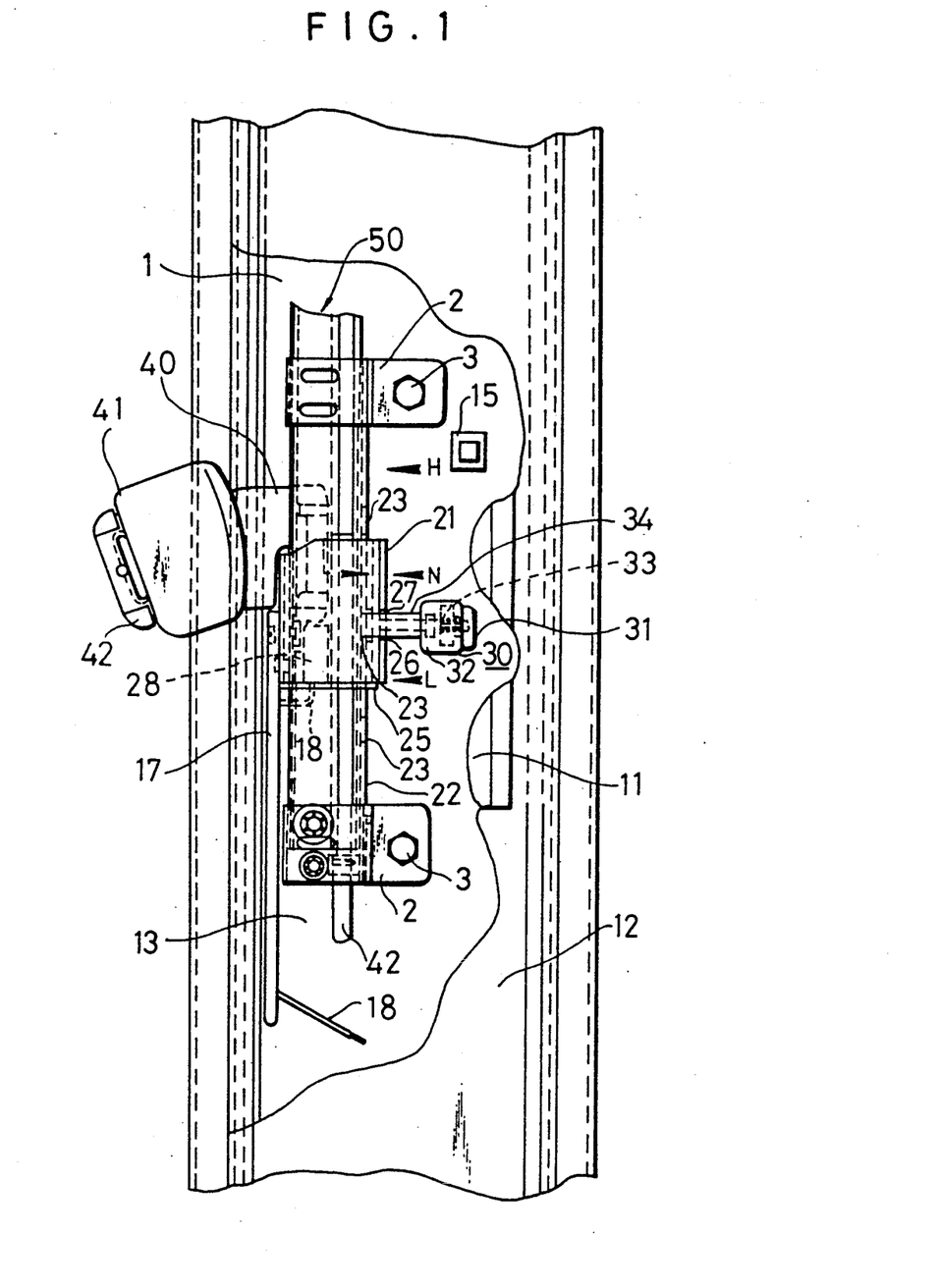
FIG. 1 is a partly cut-away, fragmentary, front elevation of a passive seat belt system according to a first embodiment of the invention.
Figure 2:
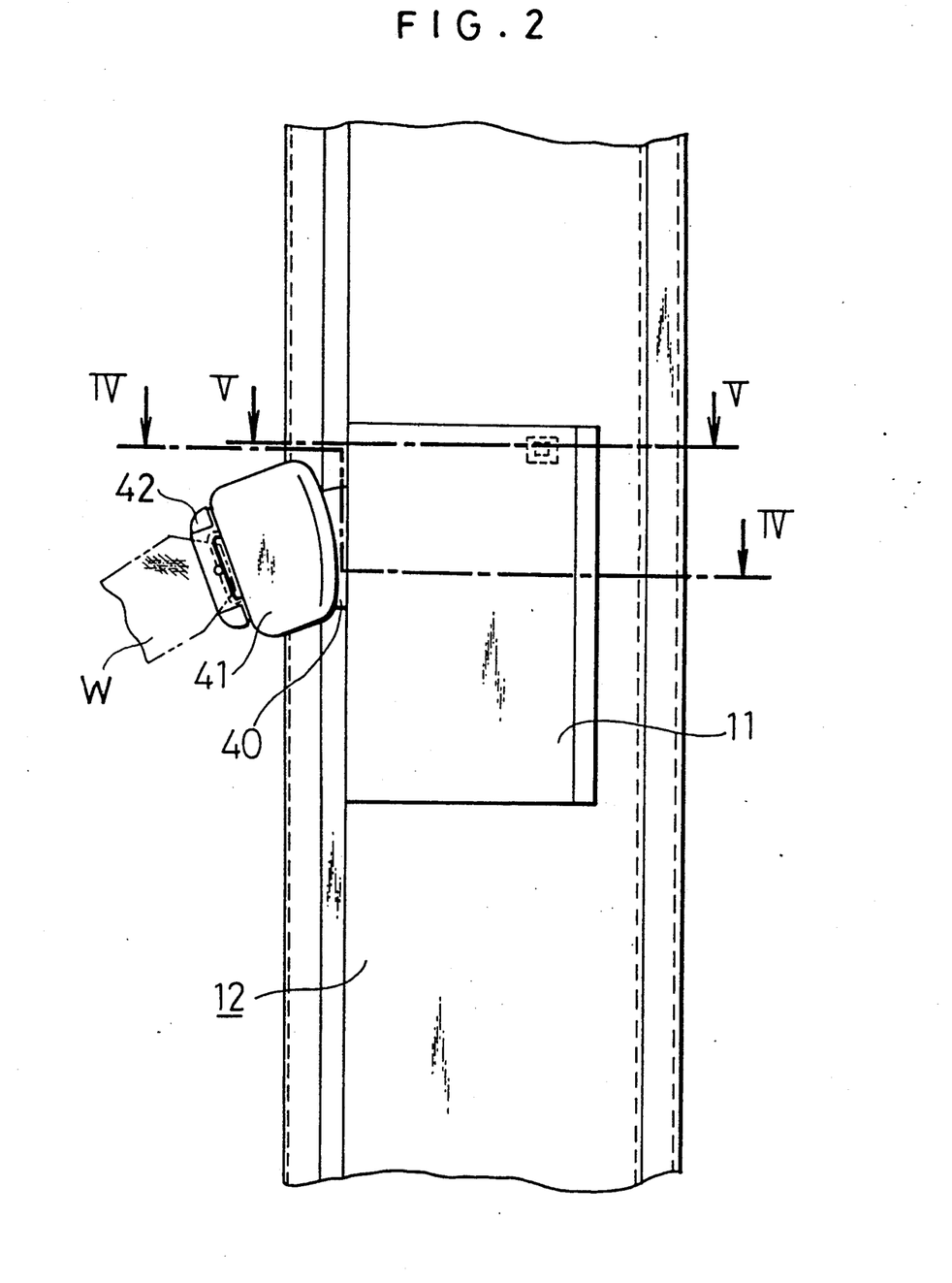
FIG. 2 is similar to FIG. 1 but a door of a trim for a center pillar is shown in a fully-closed position.

When the door 11 of the upper trim 14 is opened, an adjusting device for the position of the shoulder anchor is visible. An elongated base 22 of the adjusting device is fitted and secured on a guide rail 50. The elongated base 22 is also fixed on the center pillar 1 of a body of the vehicle by means of brackets 2,2 and bolts 3,3 as depicted in FIG. 1.

Between a anchor base 21 and the guide rail 50, a spacer 25 made of a resin material is interposed as a sliding member for reducing the frictional resistance between the guide rail 50 and spacer 25 and also as a member for preventing the occurrence of sliding noise. The spacer 25 is provided with a means for preventing it from slipping and its slip-off, so that the spacer 25 is kept in place once it is inserted in the anchor base 21.

Figure 4:
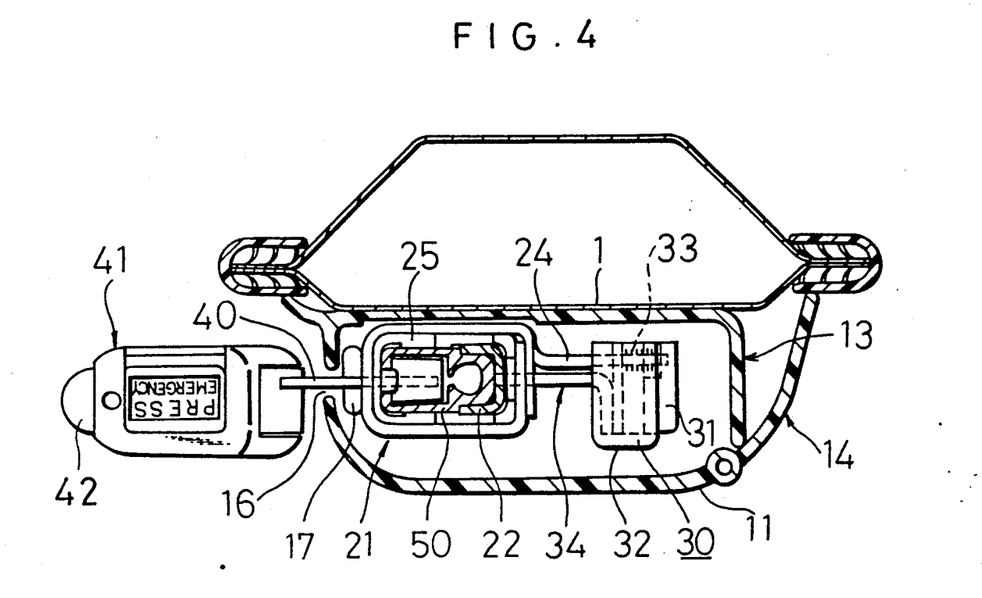
FIG. 4 is a transverse cross-sectional view taken in the direction of arrows IV—IV of FIG. 2.
Figure 5:
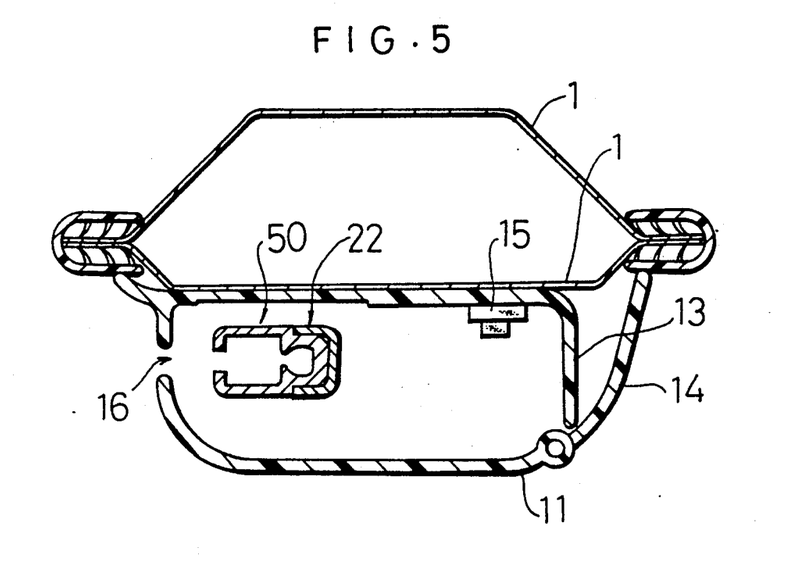
FIG. 5 is a transverse cross-sectional view taken in the direction of arrows V—V of FIG. 2.
Figure 6:
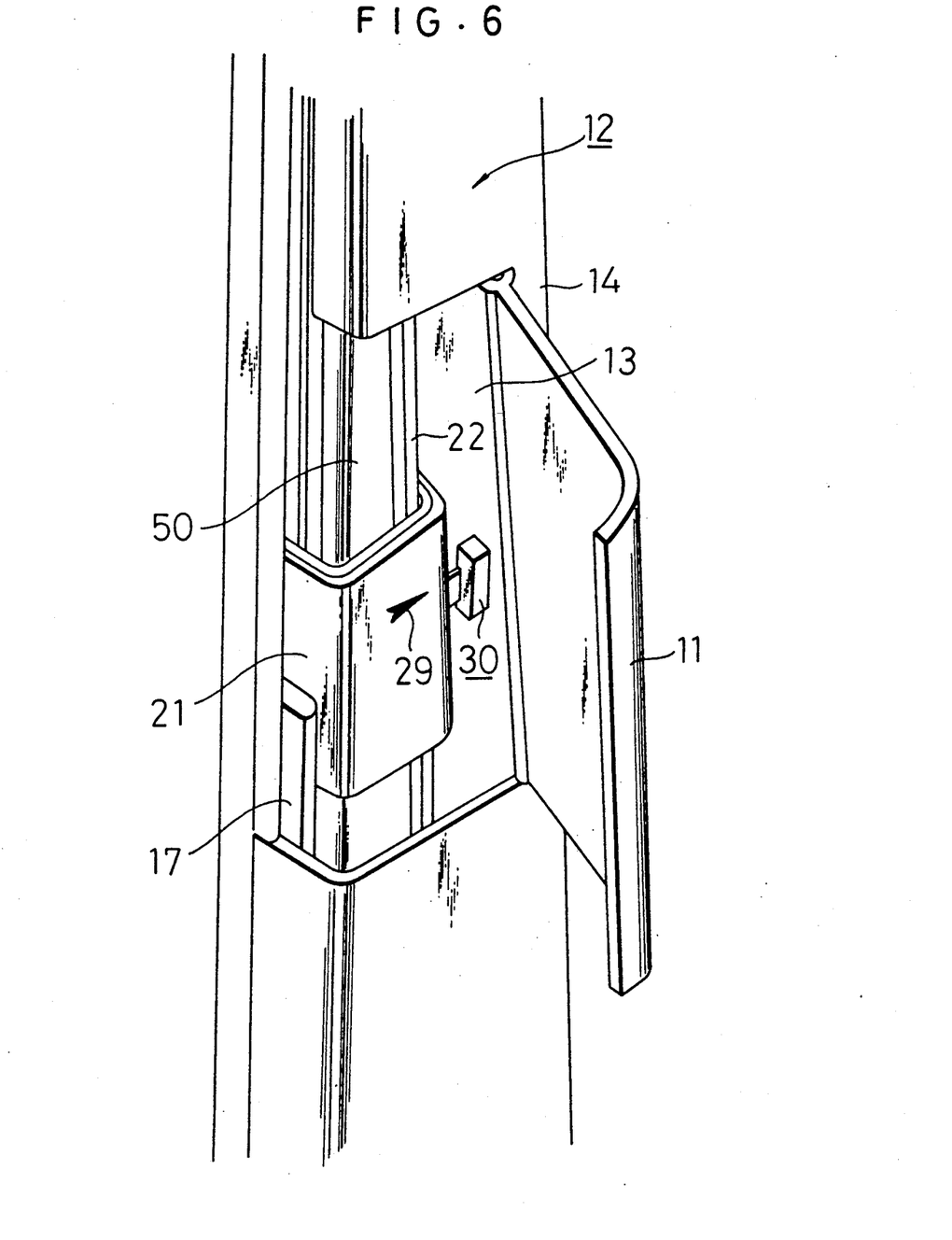
FIG. 6 is a fragmentary perspective view of the passive seat belt system, in which a slider is not shown.

As is shown in FIG. 4, the anchor base has a rectangular cross-sectional shape formed by bending a sheet metal to surround the elongated base 22 and the guide rail 50 with the spacer interposed therebetween. An arm 24 extends out from the anchor base 21 in the direction of the width of the center pillar 1, namely, toward the rear of the vehicle. The rear of the arm 24 terminates in a manipulating portion 30.

The manipulating portion 30 is composed of a finger rest 31 fixed on the arm 24 and a manipulating button 32 provided on the arm 24 slidably relative to the finger rest 31. The manipulating button 32 is fixed on a bent end portion of a latch bar 34 as a lock means. A return spring 33 is interposed between the finger rest 31 and the manipulating button 32 so that the latch bar 34 is normally biased leftward as viewed in FIG. 4. An opposite end portion of the latch bar 34 extends through a hole 26 of the anchor base 21, a hole 27 of the spacer 27 and one of longitudinally-spaced holes 23 of the elongated base 23, whereby the anchor base 21 is fixed on the guide rail 50.

A force which has been applied from a webbing W to the anchor base 21 by way of an ERB (emergency release buckle) 41 and the slider 40 is therefore transmitted to the brackets 2,2 via the elongated base 22 and the guide rail 50 and further to the unillustrated vehicle body.

As will be described subsequently, a switch 15 is provided to move the slider 40 forward over a predetermined distance upon adjustment of the position of the anchor base 21 and also to have the slider 40 returned to a restraining position after the adjustment of its position.

A rear end switch 28 is attached to the anchor base 21 in such a way that the rear end switch 28 is received in the guide rail 50. When the slider 40 is brought into engagement with the anchor base 21, the rear end switch 28 serves to detect that the slider 40 has reached the restraining position and then to stop an unillustrated slider drive means, for example, a drive motor for the slider.

A narrow concealing or concealer trim 17 is pendant from a lower front portion of the anchor base 21, so that the concealer trim 17 extends as if it internally covers the opening 16 of the trim 12. Embedded inside the concealer trim 17 is a harness 18 which serves to transmit a signal from the rear end switch 28. The inside is therefore not visible through the opening 16 even when the anchor base 21 is moved vertically. Since the concealer trim 17 is allowed to move along with the anchor base 21 whenever the anchor base 21 moved up or down, the inside is not visible through the opening 16 irrespective of the position of the anchor base 21. The trim 12 has become more pleasing in appearance owing to the provision of the concealer trim 17.

At a suitable location on an inboard surface of the anchor base 21 as a moving element and at appropriate locations on an inboard surface of the center pillar 1 or lower trim 13 as a stationary element, marks 29,29,29,29 are provided to give an indication as to the position of the anchor base 21. These marks permit an easy judgment on whether the position of the anchor base 21 has been properly adjusted or not.

Based on the above description of the adjusting device, its operation will next be described with reference to the electrical circuit shown in FIG. 10.

When an associated door is closed by an occupant, a door switch 141 is switched over to a closed side. At this time, the slider 40 is at a front end of the guide rail 50, i.e., at an occupant releasing position. The rear end switch 28, which takes an open position only when the slider 40 is at a rear end position of the guide rail 50, is in a closed state. Accordingly, a current is caused to flow to an exciting coil 143a of a relay 143 so that a switch 143b is switched over to the left-hand side as viewed in FIG. 10. A current is therefore caused to flow through a motor 108 in the direction indicated by a dashed arrow, thereby causing the slider 40 to slide toward the rear end of the guide rail 50. Here, a front end switch 142 which can take an open state only when the slider 40 is at the front end is closed.

When the slider 40 reaches the occupant restraining position and engages with the anchor base 21, the rear end switch 28 is brought into an open state. The exciting coil 143a of the relay 143 is hence brought into a non-excited state, whereby the switch 143b turns to the right-hand side as viewed in FIG. 10 to stop the motor 108. When a tongue 42 (see FIGS. 1-4) is latched properly in the ERB 41 at this point of time, a buckle switch 130 is brought into an open state. If the tongue 42 is not latched in the ERB 41, the buckle switch 130 remains in its closed state. In this case, a lamp 146 is turned on and a buzzer 147 is caused to generate a warning sound, thereby recommending the occupant to latch the tongue 42 into the ERB 41.

When the slider 40 is at the occupant restraining position as shown in FIG. 1, a door switch 141 is changed over to an open side when the door is opened. Since the front end switch 142 is in its closed state at this point of time, a current is fed to an exciting coil 148a of a relay 148 and a switch 148b is changed over to the left-hand side as viewed in FIG. 10. As a consequence, a current is caused to flow through the motor 108 in the direction indicated by a solid arrow. In this manner, the slider 40 reaches the front end of the guide rail 50, i.e., the occupant releasing position, so that the front end switch 142 is brought into the open state and the motor 108 is stopped.

Here, the rear end switch 28 and the buckle switch 130 are each maintained in the closed state. When the occupant closes the door again at this point of time, the slider 40 reaches the occupant restraining position through the above-described course of operation.

A description will next be made of a procedure for adjusting the position of the anchor base 21 when the anchor base 21 is in the state shown in FIG. 3.

Figure 3:
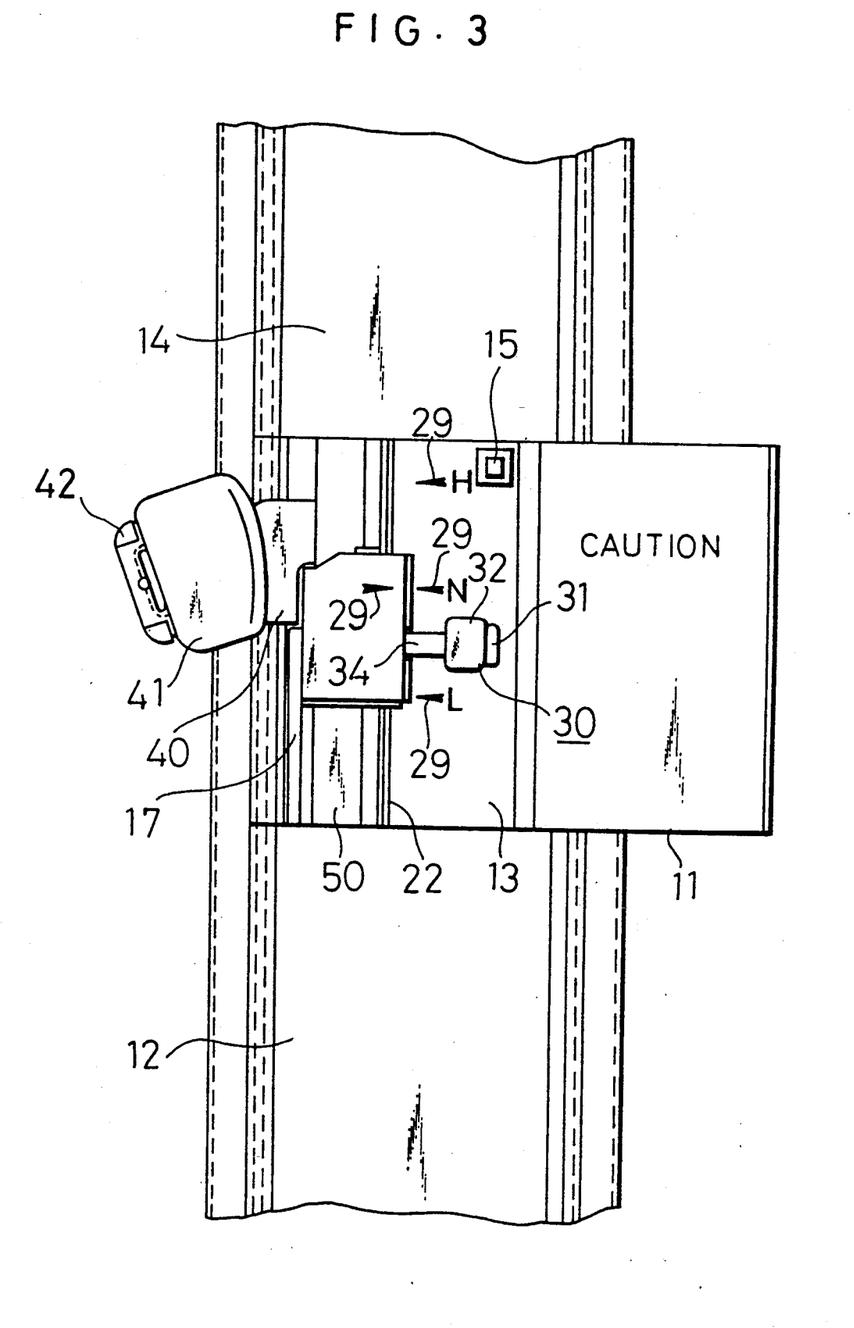
FIG. 3 is similar to FIG. 1 but the door of the trim is shown in a fully-opened position.

The switch 15 is depressed first of all in the state depicted in FIG. 3, whereby the slider 40 is moved forward over a predetermined distance. This is indispensable because the slider 40 is connected to a drive unit, which is provided on a vehicle body underneath the center pillar 1, by way of a drive member such as a cable or the like and even if one attempts to change the position of the anchor base 21 at the occupant-restraining position, the anchor base 21 and the slider 40 are fixed and the position of the anchor base 21 cannot be changed. To change the position of the anchor base 21 without providing the switch 15, it is necessary to release the engagement between the slider 40 and the anchor base by performing an extra operation, for example, by opening the associated door.

Figure 10:
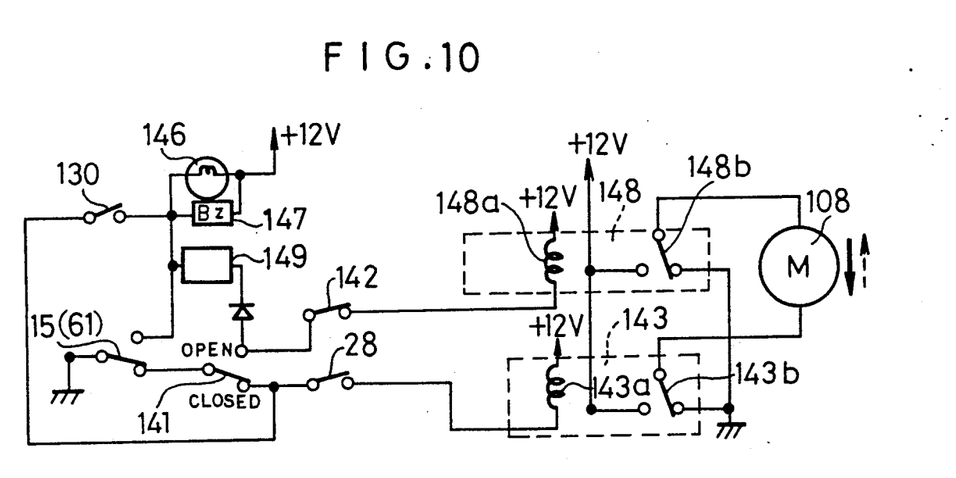
FIG. 10 is a circuit diagram suitable for use in the passive seat belt system according to the second embodiment.

When the switch 15 is depressed as described above, the switch 15 is changed over to the upper side as viewed in FIG. 10. Since the front end switch 142 is in the closed state a this point of time, the relay 148 is brought into the excited state and a current is caused to flow through the motor 108 in the direction indicated by the solid arrow as described above. Accordingly, the slider 40 starts moving toward the front end of the guide rail 50. Since this feeding of the current is effected only for a certain period of time preset by a timer 149, the slider 40 is released from the anchor base 21 and is then stopped at a suitable position.

Figure 7:
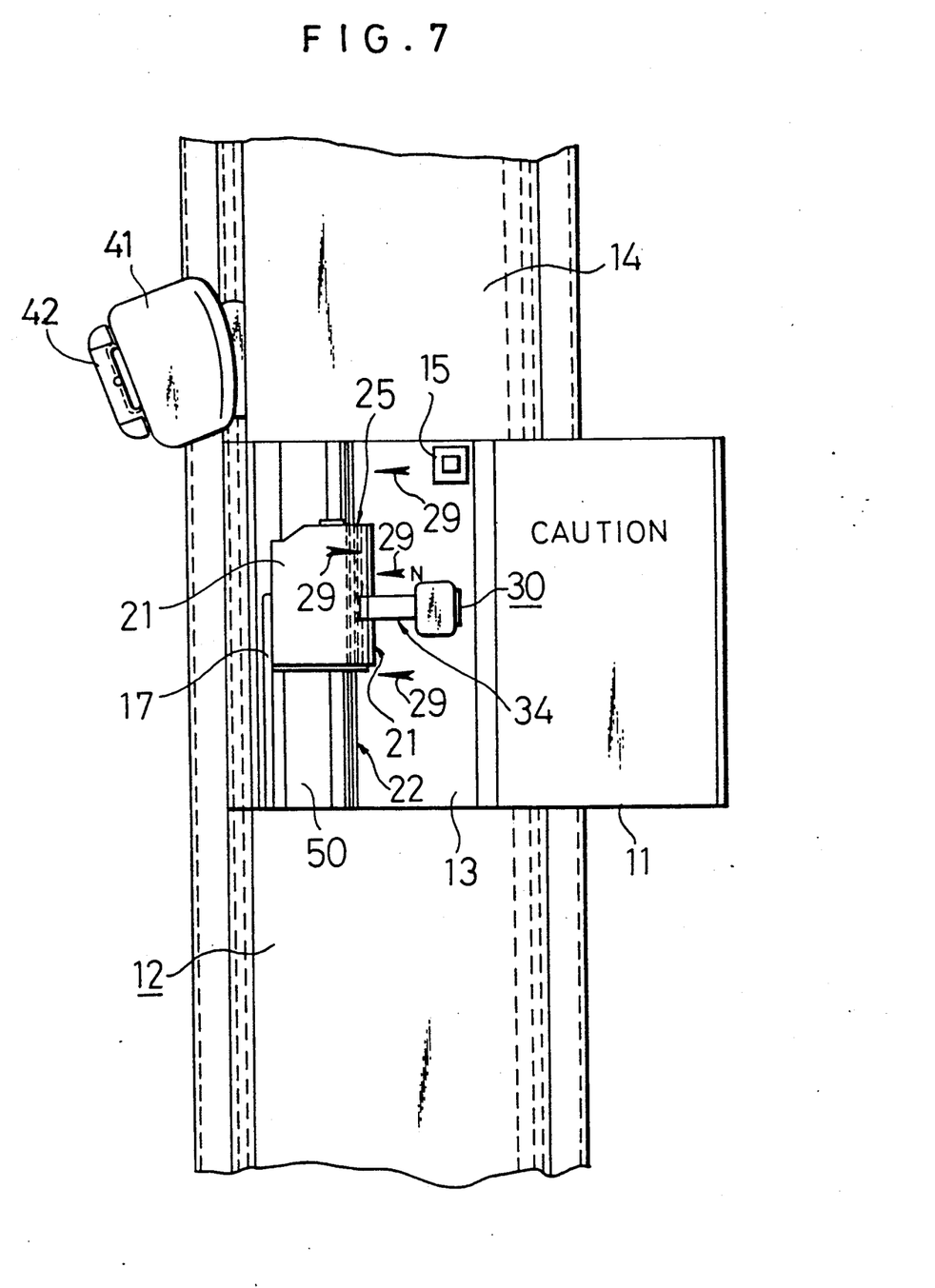
FIG. 7 illustrates the manner of adjustment of the position of a shoulder anchor.

After depressing the switch 15 and moving the slider 40 forward over the predetermined distance as described above, the manipulating button 32 provided at the bent end portion of the latch bar 34, which is holding the anchor base 21 relative to the guide rail 50, and the finger rest 31 are pinched to move the latch bar 34 rightwards against the force of the return spring 33, whereby the latch bar 34 is disengaged from the guide rail 50. The anchor base 21 is then slid to the desired position, for example, until the mark 29 on the anchor base 21 is brought into registration with the mark N (29) on the center pillar 1. The pinching of the manipulating button 32 and the finger rest 31 is released to have the latch bar 34 moved leftward by the action of the return spring 33 as viewed in FIG. 3, so that the opposite end portion of the latch bar 34 is inserted into the corresponding hole 23 of the elongated base 21 to fix the anchor base 21 there. In FIG. 7, the anchor base 21 has been moved further in the upward direction from its position in FIG. 3 by depressing the switch 15 and moving the slider 40 upward.

By depressing the switch 15 again subsequent to the above-described adjustment of the position of the anchor base 21, the switch 15 is changed again to the lower side as viewed in FIG. 10. The relay 143 is then brought into an excited state and a current is caused to flow through the motor 108 in the direction indicated by the dashed arrow. As a result, the slider 40 is caused to return to the restraining position. Any desired means can be used to move the slider 40 over the predetermined distance and then to have the slider 40 returned to the restraining position by the operation of the switch 15.

Figure 8:
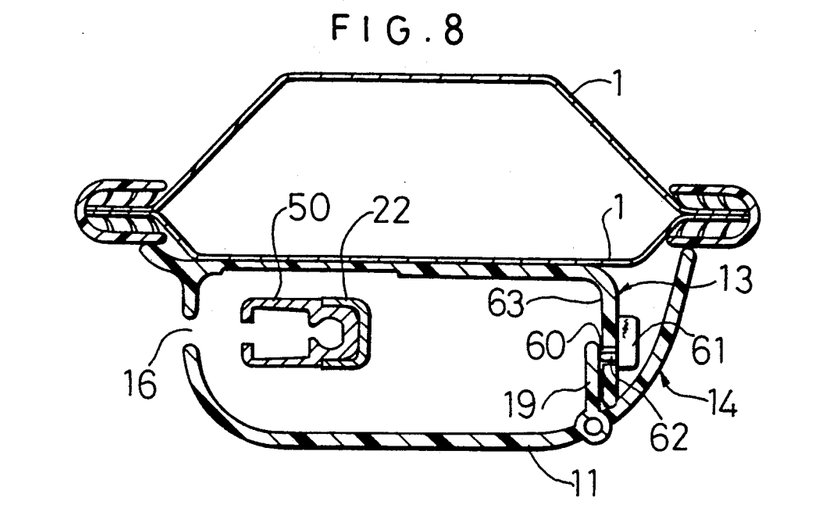
FIG. 8 is similar to FIG. 5 but showing a passive seat belt system according to a second embodiment of the invention in which a door of a trim is closed.
Figure 9:
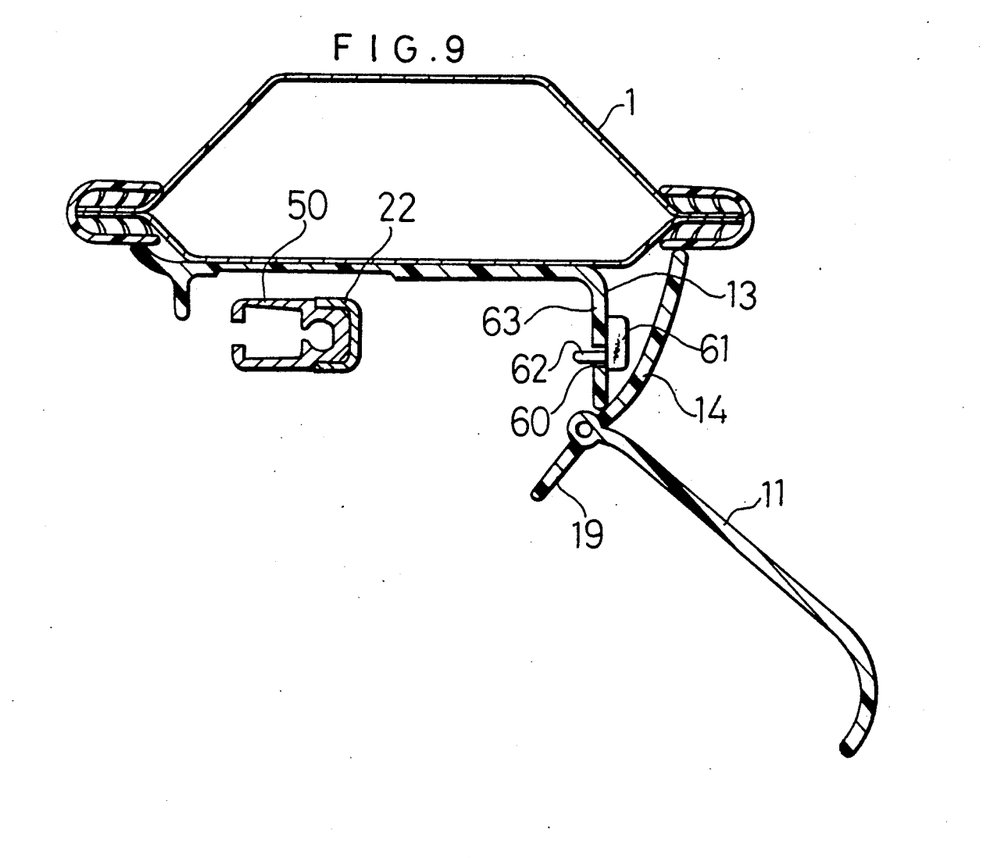
FIG. 9 is similar to FIG. 8 but the door is in a fully-opened position.

The second embodiment of the invention will next be described with reference to FIGS. 8 and 9. Since it is cumbersome to depress the button 15 to move the slider 40 whenever positional adjustment of the anchor base 21 is needed, a slider is moved by operating a switch 61, which corresponds to the switch 15 in the first embodiment described above, responsive to the opening and closure of the door 11 of the upper trim 14. The door 11 is provided with a lever 19. An actuator 62 for a switch 61 projects out through a bore 60 formed in a rib 63 of the lower trim 13. When the door 11 is closed, the lever 19 of the door 11 holds the actuator 62 in a pressed position to prevent the slider 40 from running. When the door 11 is opened, the lever 19 of the door 11 is separated from the actuator 62 so that the switch 61 is actuated to have the slider 40 run over the predetermined distance. When the positional change of the anchor base 21 is finished and the door 11 is closed, the lever 19 presses the actuator 62 so that the slider 40 returns to the restraining position.

As described above, any desired means can be used to move the slider over the predetermined distance and then to have the slider returned to the restraining position.

Figures 11, 12:
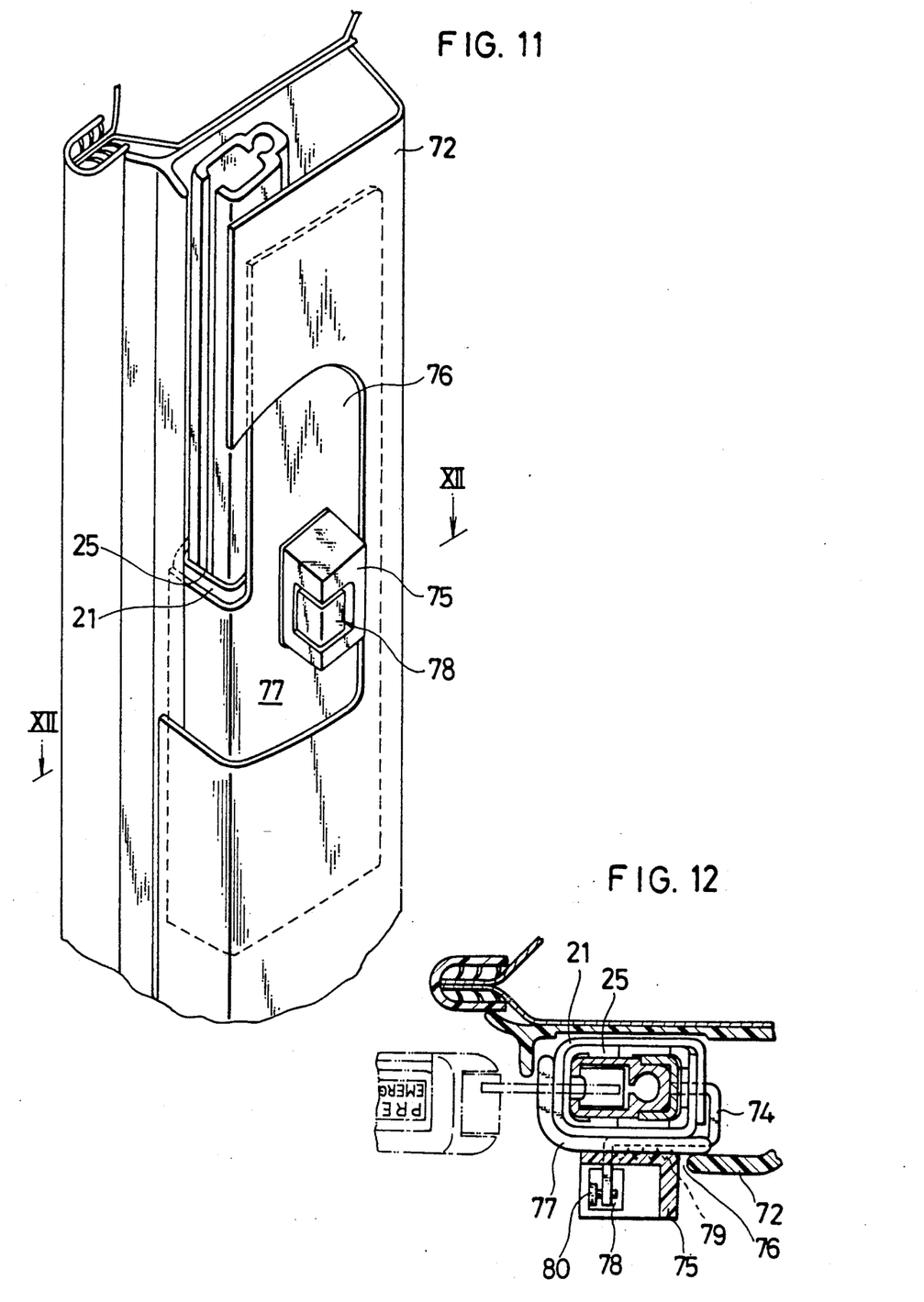
FIG. 11 is a partly cut-away, fragmentary, perspective view of a passive seat belt system according to a third embodiment of the invention.
FIG. 12 is a transverse cross-sectional view in the direction of arrows XII—XII of FIG. 11.

The third embodiment of the invention will now be described with reference to FIG. 11 and 12. An opening 76 is formed through a trim 72 at a position corresponding to the location of the adjusting device for the position of the shoulder anchor. In a manner to close up the opening 76, a concealing or concealer trim 77 is attached to the anchor base 21 by a suitable method. This concealer trim 77 is vertically dimensioned larger than the opening 76 so that the opening 76 can be closed up no matter whether the anchor base 21 is located at the uppermost position or at the lowermost position. A holder 75 is fixed on the inboard surface of the concealer trim 77. Received in the holder 75 is a button 78 in which an end portion of a latch piece 74 is fixed by a screw 80. When one wants to adjust the position of the anchor base 21, he has to press the button 78 rightwards as viewed in FIG. 12. This causes the latch piece 74 to move rightwards against the repulsive force of a coil spring 79 so that the latch piece 74 is disengaged from the anchor base 21. The position of the anchor base 21 is adjustable in a similar manner to the embodiments described above. The present embodiment can therefore improve the appearance of the interior of a vehicle like the preceding embodiments as the opening 76 is formed through the trim 72 and the opening 76 is closed up by the concealer trim 77.

Further, adjustment of the anchor base 21 can be easily conducted because the button 78 adapted to be manipulated upon positional adjustment of the anchor base 21 is provided on the inboard surface of the concealer trim 77.

What is claimed is:

1. A passive seat belt system for a vehicle, comprising:
   a guide rail;
   a slider carrying an occupant-restraining webbing fastened thereto and arranged movably along the guide rail between a restraining position, at which said webbing restrains an occupant, and a releasing position at which said occupant is free from restraint by said webbing, said restraining and releasing positions being on the side of a rear end portion of said guide rail and on the side of a front end portion of said guide rail, respectively, and said rear end portion of said guide rail extending vertically along a center pillar of said vehicle;
   an adjusting device provided on the side of said rear end portion of said guide rail for adjusting said restraining position of said slider;
   a trim covering said rear end portion of said guide rail and said adjusting device; and
   an openable/closable door formed in said trim at a position corresponding to the position at which said adjusting device is arranged.

2. The system of claim 1, further comprising a means for driving said slider and a means for controlling said drive means.

3. The system of claim 2, wherein said control means has a switch which when operated manually, can selectively take one of a first state, in which said drive means is actuated to cause said slider to retreat from said restraining position, and a second state in which said drive means is actuated to move said slider to said restraining position.

4. The system of claim 3, wherein said switch is arranged inside said trim in such a way that said switch can be operated only when said door is opened.

5. The system of claim 3, wherein said switch is brought into said first state upon opening of said door and into said second state upon closure of said door.

6. The system of claim 3, wherein said control means has a timer and when the switch is in the first state, the retreat of said slider is effected by moving said slider for a predetermined period of time by means of a timer.

7. The system of claim 1, wherein said adjusting device comprises:
an elongated base secured on said guide rail;
an adjustable anchor base movable along said elongated base and engageable with said slider; and
a lock means for fixing said adjustable anchor base relative to said elongated anchor base.

8. The system of claim 7, further comprising a means capable of serving as a reference mark upon positioning of said anchor base by said lock means.

9. A passive seat belt system for a vehicle, comprising:
a guide rail;
a slider carrying an occupant-restraining webbing fastened thereto and arranged movably along the guide rail between a restraining position, at which said webbing restrains an occupant, and a releasing position at which said occupant is free from restraint by said webbing, said restraining and releasing positions being on the side of a rear end portion of said guide rail and on the side of a front end portion of said guide rail, respectively, and said rear end portion of said guide rail extending vertically along a center pillar of said vehicle;
an adjusting device provided on the side of said rear end portion of said guide rail for adjusting said restraining position of said slider;
a trim covering said rear end portion of said guide rail and said adjusting device;
an opening formed through said trim at a position corresponding to the path of movement of said slider; and
a concealer trim provided between said adjusting device and said trim to close up the opening.

10. The system of claim 9, further comprising a switch for detecting the presence of said slider at said restraining position, said switch being arranged within said guide rail.

11. The system of claim 10, further comprising a harness for transmitting a signal from said switch, said harness being embedded within said concealer trim.

12. The system of claim 9, wherein said concealer trim is attached to said adjusting device.

13. A passive seat belt system for a vehicle, comprising:
a guide rail;
a slider carrying an occupant-restraining webbing fastened thereto and arranged movably along the guide rail between a restraining position, at which said webbing restrains an occupant, and a releasing position at which said occupant is free from restraint by said webbing, said restraining and releasing positions being on the side of a rear end portion of said guide rail and on the side of a front end portion of said guide rail, respectively, and said rear end portion of said guide rail extending vertically along a center pillar of said vehicle;
an adjusting device provided on the side of said rear end portion of said guide rail for adjusting said restraining position of said slider;
a trim covering said rear end portion of said guide rail;
an opening formed through said trim at a position corresponding to the location at which said adjusting device is arranged; and
a concealer trim provided between said adjusting device and said trim and closing up said opening.

14. The system of claim 13, wherein said adjusting device comprises:
an elongated base secured on said guide rail;
an adjustable anchor base movable along said elongated base and engageable with said slider; and
a lock means for fixing said adjustable anchor base relative to said elongated base.

15. The system of claim 14, further comprising a manipulating portion for manipulating said lock means, said manipulating portion being provided on an inboard side of said concealer trim.

16. The system of claim 13, wherein said concealer trim is attached to said adjusting device.

* * * * *